N. Irish,
Harness Attachment,
No 81,092.    Patented Aug. 18, 1868.
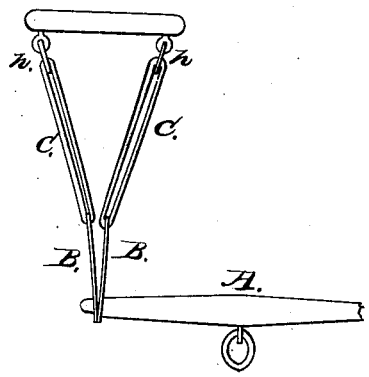
Witnesses,
V. D. Stockbridge
C. H. Blue
Inventor
Nathaniel Irish
hr
Alexander Mason
atty

United States Patent Office.

NATHANIEL IRISH, OF ROCHESTER, MINNESOTA.

Letters Patent No. 81,092, dated August 18, 1868.

---

IMPROVEMENT IN ATTACHING POLE-STRAPS TO NECK-YOKES.

---

The Schedule referred to in these Letters Patent and making part of the same.

---

TO ALL WHOM IT MAY CONCERN:

Be it known that I, NATHANIEL IRISH, of Rochester, in the county of Olmsted and in the State of Minnesota, have invented certain new and useful Improvements in Mode of Attaching Pole-Straps to Neck-Yoke, and do hereby declare that the following is a full, clear, and exact description thereof, reference being had to the accompanying drawings, and the letters of reference marked thereon.

In the annexed drawings, making a part of this specification, A represents a neck-yoke which is attached to the pole of a vehicle in the ordinary manner, and provided at the ends thereof with catch-cock, over which are adjusted the metallic loops B, which are thereby held.

B B represent metallic loops, which are provided with a slot $x$, and which catch on and behind the barbs or shoulders of the catch-cock on the end of the neck-yoke A, and also provided with slots across and near one end, through which the pole-straps C C pass and are fastened.

The pole-straps C C pass through the rings $h\ h$ in the hames of the harness and slot at the end of the loops B B, and then buckled or fastened at any desired length. It will be seen by reference to fig. 1 of the drawings that there is a separate strap for each of the rings in the hames, and each is provided with or has secured to it a loop, B.

Now, when it is desired to attach a horse to the yoke A, all that is necessary is to slip the metallic loops B B over the catch-cock on the end of the neck-yoke A, and when the traces of the harness are attached to the swingle-tree, the pole-straps are drawn up tight, and then the loops B B cannot become detached from the neck-yoke. To detach the loops B B, and thereby the horse from the neck-yoke, first detach the harness-tags from the swingle-tree, and then slip them off as readily and in a similar manner as when adjusted.

Having thus fully described my invention, what I claim as new, and desire to secure by Letters Patent, is—

The pole-straps C C and metallic loops B B, when constructed, arranged, and used substantially in the manner set forth In testimony that I claim the foregoing, I have hereunto set my hand, this 4th day of January, 1868.

NATHANIEL IRISH.

Witnesses:
J. V. DANIELS,
D. A. DANIELS.